US008824587B2

(12) United States Patent
Zhang et al.

(10) Patent No.: US 8,824,587 B2
(45) Date of Patent: Sep. 2, 2014

(54) SYSTEMS AND METHODS FOR COMPRESSED FEEDBACK AND SUBCARRIER GROUPING FOR BEAMFORMING

(75) Inventors: Hongyuan Zhang, Fremont, CA (US); Salvador Iranzo Molinero, Betera (ES)

(73) Assignee: Marvell World Trade Ltd, St. Michael (BB)

( * ) Notice: Subject to any disclaimer, the term of this patent is extended or adjusted under 35 U.S.C. 154(b) by 0 days.

(21) Appl. No.: 13/490,026

(22) Filed: Jun. 6, 2012

(65) Prior Publication Data

US 2012/0314791 A1 Dec. 13, 2012

Related U.S. Application Data

(60) Provisional application No. 61/494,357, filed on Jun. 7, 2011, provisional application No. 61/497,318, filed on Jun. 15, 2011, provisional application No. 61/507,907, filed on Jul. 14, 2011.

(51) Int. Cl.
*H04B 7/02* (2006.01)

(52) U.S. Cl.
USPC .......................................... 375/267

(58) Field of Classification Search
None
See application file for complete search history.

(56) References Cited

U.S. PATENT DOCUMENTS

| 2006/0155798 | A1* | 7/2006 | Ketchum et al. | 708/607 |
|---|---|---|---|---|
| 2006/0239374 | A1* | 10/2006 | Aldana et al. | 375/267 |
| 2006/0245513 | A1* | 11/2006 | Koo et al. | 375/267 |
| 2007/0104288 | A1 | 5/2007 | Kim | |
| 2009/0092198 | A1* | 4/2009 | Motoyoshi et al. | 375/267 |
| 2009/0190691 | A1* | 7/2009 | Ariyavisitakul et al. | 375/295 |

FOREIGN PATENT DOCUMENTS

| EP | 2 343 836 | 7/2011 |
|---|---|---|
| WO | WO 2010/062051 | 6/2010 |

OTHER PUBLICATIONS

International Search Report and Written Opinion of the International Searching Authority of Application No. PCT/US2012/041098, mailed Jul. 18, 2012.
Gunnam et al. "Multi Rate Layered Decoder Architecture for Black LDPC Codes of the IEEE 802.1 Wireless Standard" 1-4244-0921-7/07 © 2007 IEEE (pp. 1645-1648).

* cited by examiner

*Primary Examiner* — Chieh M Fan
*Assistant Examiner* — Wednel Cadeau

(57) ABSTRACT

Methods and apparatuses are provided for providing compressed feedback channel state information for beamforming. A beam transmitted by a transmission source is received at a receiving device. The receiving device computes a channel state matrix H of the transmission channel based on the received beam. Using the channel state matrix H, the receiving device performs a singular value decomposition procedure that produces a steering matrix V. The singular value decomposition procedure generates a set of angles ($\theta_V$, $\phi$) from which the steering matrix V can be computed. The receiving device transmits the set of angles ($\theta_V$, $\phi$) to the transmitting device. From the set of angles ($\theta_V$, $\phi$), the transmitting device can compute the steering matrix V.

21 Claims, 5 Drawing Sheets

US 8,824,587 B2

SYSTEMS AND METHODS FOR COMPRESSED FEEDBACK AND SUBCARRIER GROUPING FOR BEAMFORMING

CROSS REFERENCE TO RELATED APPLICATIONS

This disclosure claims the benefit of U.S. Provisional Application No. 61/494,357, filed Jun. 7, 2011, U.S. Provisional Application No. 61/497,318, filed Jun. 15, 2011, and U.S. Provisional Application No. 61/507,907, filed Jul. 14, 2011, which are hereby incorporated by reference herein in their entireties.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The present disclosure is directed to methods and apparatuses for directing a beam over a communication channel towards a receiving device (e.g., beamforming), and, more particularly, to computing compressed feedback information from which a transmission source can compute a steering matrix for the communications channel.

Beamforming is a signal processing technique used in systems for directional signal transmission or reception. Spatial selectivity may be achieved by using adaptive or fixed receive/transmit beam patterns. Beamforming takes advantage of constructive/destructive wave interference to change the direction of a beam. As defined herein, a beam is an electromagnetic wave that carries data to a receiver and that is formed by the constructive/destructive interference pattern of two or more waves transmitted by one or more antennas.

Traditionally, a receiving device receives a beam from the transmission source and computes a channel state matrix for the intended channel. The receiver transmits the channel state matrix back to the transmission source for modifying the shape of the transmitted beam. In other previous implementations, the receiver transmits feedback that includes a steering matrix or a compressed steering matrix from which a steering matrix can be calculated. The compressed steering matrix reduces the amount of data that must be sent by the receiver. However, computing the compressed steering matrix in previous methods involved additional processing computation beyond the computation of the steering matrix. Although these mechanisms for performing beamforming are effective, these systems are inefficient in the amount of data in the feedback to the transmission source or the amount of processing that is required to generate the feedback that is sent to the transmission source.

SUMMARY

In accordance with the principles of the present disclosure, methods and apparatuses are provided for directing a beam over a communication channel towards a receiving device based on a steering matrix (e.g., beamforming), and, more particularly, to computing, at a receiving source, compressed feedback from which a transmitting source can compute a steering matrix for the communications channel.

A beam transmitted by a transmission source is received at a receiving device. The receiving device computes a channel state matrix H of the transmission channel based on the received beam. Using the channel state matrix H, the receiving device performs a singular value decomposition procedure that produces a steering matrix V. The singular value decomposition procedure generates a set of angles ($\theta_V$, $\phi$) from which the steering matrix V can be computed. The receiving device transmits the set of angles ($\theta_V$, $\phi$) to the transmitting device. From the set of angles ($\theta_V$, $\phi$), the transmitting device can compute the steering matrix V.

In some implementations, the singular value decomposition procedure involves performing a QR decomposition of the channel state matrix H to determine a Q matrix and an R matrix. Singular value decomposition is then performed on the R matrix using a closed form Jacobi method to determine the Hermitian transpose of the steering matrix ($V^H$). In this implementation, the steering matrix V can be calculated from the set of angles ($\theta_V$, $\phi$) according to the following equation:

$$V = \begin{bmatrix} e^{j\varphi}\cos\theta_V & e^{j\varphi}\sin\theta_V \\ -\sin\theta_V & \cos\theta_V \end{bmatrix}.$$

The singular value decomposition procedure described above can generate a third angle $\theta_U$. The singular values of the channel state matrix H can then be derived based on the angle $\theta_V$, the angle $\theta_U$, and a rotation of the R matrix. Additionally, a signal-to-noise ratio of the channel can be calculated based on one of the derived singular values.

In other implementations, the singular value decomposition procedure involves determining the Hermitian transpose of the channel state matrix ($H^H$). The product $H^H H$ is calculated by multiplying the Hermitian transpose of the channel state matrix ($H^H$) by the channel state matrix H. The singular value decomposition of the product $H^H H$ is then performed using a closed Jacobi method. In this implementation, the steering matrix V can be calculated from the set of angles ($\theta_V$, $\phi$) according to the following equation:

$$V = \begin{bmatrix} \cos\theta_V & \sin\theta_V \\ -e^{j\varphi}\sin\theta_V & e^{j\varphi}\cos\theta_V \end{bmatrix}.$$

After performing the above singular value decomposition procedure, the singular values of the channel state matrix H can be derived based on the angle $\theta_V$ and a rotation of the product $H^H H$. Additionally, a signal-to-noise ratio of the channel can be calculated based on one of the derived singular values.

In some implementations, the receiving device receives from the transmitting device a beam that is directed based on the steering matrix V calculated by the transmitting device from the received angles ($\theta_V$, $\phi$). In some implementations, the beam includes a first subcarrier and a second subcarrier that are steered according to different steering matrices. The steering matrix for the first subcarrier is based on the set of angles ($\theta_V$, $\phi$), and the steering matrix for the second subcarrier is based on a second set of angles ($\theta_V$, $\phi$). The angle $\phi_2$ can be determined by shifting the angle $\phi$ by a phase increment calculated as follows:

phase increment=$2*\pi*T_{CS}*F_{SC}$

In the above equation, $T_{CS}$ is a cyclic shift time, and $F_{SC}$ is the frequency separation between the first subcarrier and the second subcarrier.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

This disclosure generally relates to directing a beam (e.g., beamforming) based on channel information. For illustrative purposes, some embodiments of this disclosure are described in the context of a wireless local area network (WLAN) system with an intended transmission source (e.g., the base station that is meant to communicate with a receiving device) and, in some embodiments, one interfering source (e.g., a different base station or another source generating interference signals). It should be understood, however, that this disclosure is applicable to any number of interfering sources in any multi-transmission source system (e.g., WMAN, WiMAX, BLUETOOTH and/or 3GPP LTE). In addition, this disclosure is applicable to wired communication paths (e.g., power lines, phone lines, coaxial cables).

Multiple-Input Multiple-Output (MIMO) systems may be used to improve link reliability and throughput in different environments. Applying beamforming may further improve the MIMO system performance by directing the beam in the appropriate direction to a particular device (e.g., from the base station to the mobile station). Directing the beam to the receiving device may increase the received signal power and reduce any interference power that may be present. For example, while the intended receiving device receives a high power signal (e.g., high signal-to-interference-and-noise-ratio (SINR)) other devices may receive the signal with a lower power (e.g., low SINR) that may even appear as noise, and the other devices may therefore disregard the signal.

The receiving device may compute estimates of channels associated with the intended transmission source. The receiving device may provide the computed estimates or compressed feedback to the intended transmission source as a feedback signal. The transmission source uses the feedback signal information to modify characteristics of the beam and thereby the shape of the beam to compensate for any interference patterns. Techniques for direct channel estimate feedback systems and their functionalities are described in greater detail in Lee et al. U.S. patent application Ser. No. 12/363,047, filed Jan. 30, 2009, and Lee et al. U.S. patent application Ser. No. 12/818,430, filed Jun. 18, 2010, which are hereby incorporated by reference herein in their entireties.

As referred to herein, the term beamformer identifies the originator of the beam (e.g., a wireless network point) and the term beamformee identifies the receiving device that receives the beam from the beamformer (e.g., a client device). The beamformee may also receive interference patterns caused by other transmission sources (referred to as interfering sources).

Figure 1:
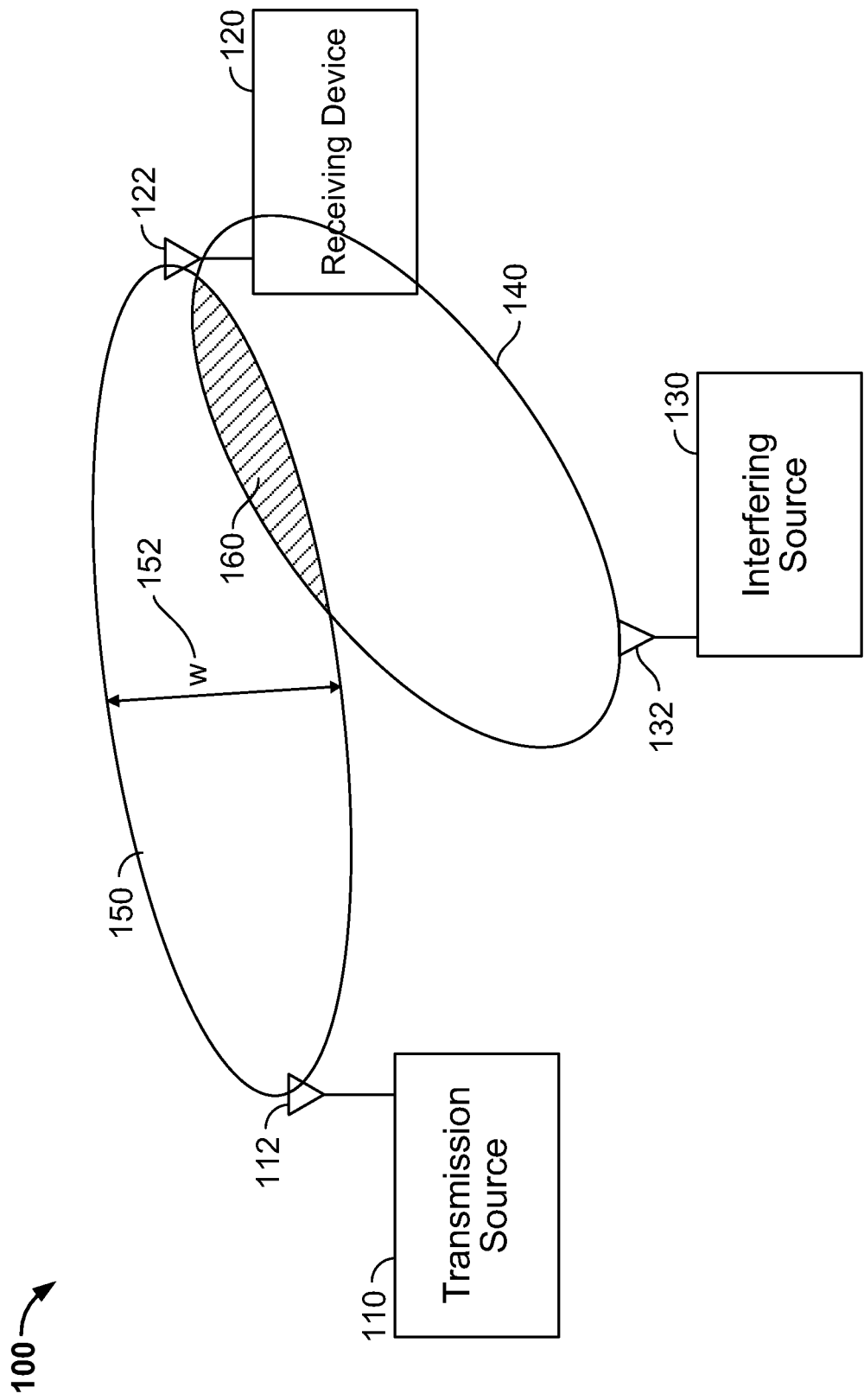
FIGS. 1 and 2 are diagrams of illustrative beamforming systems in accordance with an embodiment of the present disclosure.

FIG. 1 is a diagram of an illustrative beamforming system 100 in accordance with an embodiment of the present disclosure. The beamforming system 100 may include a transmission source 110, a receiving device 120, and an interfering source 130. The transmission source 110 (i.e., the beamformer) may be an access point in a wireless network that provides and receives data to/from the receiving device 120.

The transmission source 110 may include any number of antennas 112 (typically two or more) to transmit a signal towards a particular device. For example, processing circuitry (not shown) within the transmission source 110 may be used to modify characteristics of signals provided to the antennas 112 to shape the transmission of the signals and thereby the beam in a particular way. More specifically, when transmitting, a beamformer with multiple antennas 112 may control the phase and relative amplitude of the signal at each antenna of the transmitter in order to create a pattern of constructive and destructive interference in the wavefront generated by each antenna. This pattern of constructive and destructive interference shapes the beam (i.e., the wave) formed by the combination of the waves from each antenna and points the beam in a particular direction (e.g., towards the receiving device 120).

More specifically, the transmission source 110 may generate a beam 150 using the antennas 112. Instead of being circular, the beam 150 may have an elliptical shape which is more focused at one portion than other portions. The shape of the beam 150 may have a minor axis width 152. In general, it is desirable to make the beam width as narrow as possible in order to have the beam directed towards a desired receiver. On the other hand, there is a limit to how narrow a beam width can be made because the beam width is a function of the number of antennas and the antenna configuration. Usually, the larger the antenna separation, the narrower the resulting beam width. However, because the transmitter is inherently limited in physical space, the antennas can only be positioned a certain distance apart and thereby may have a maximum limit to the narrowness of the beam width the antennas can form.

The receiving device 120 may be a mobile device, laptop computer, desktop computer, tablet computer, PDA, network adapter, or any other suitable device used for communicating with the transmission source 110. The receiving device 120 may have one or more antennas 122 for receiving the beam 150. Depending on the location of the receiving device 120, there may exist one or more interfering sources 130 that generate signals that interfere with the signals intended to be received by the receiving device 120. For example, multiple access points may generate signals that overlap a particular region in which the receiving device 120 is situated. The receiving device 120 may communicate with one of the access points and the other access points that have signals reaching the particular region may interfere with the signals of the access point with which the receiving device 120 communicates.

In particular, interfering source 130 may have one or more antennas 132. Interfering source 130 may be another transmission source, noise, another receiving device, or any other source that may transmit signals that overlap with the signals transmitted by the transmission source 110. Interfering source 130 may generate a beam 140 that may overlap with beam 150 over some region 160. The shape of beam 150 may change as a result of the overlap in region 160 with interfering signals or beam 140 to be different from what was intended by transmission source 110. The signal-to-interference-and-noise-ratio (SINR) of beam 150 may therefore be reduced due to the interference caused by interfering signals or beam 140.

It should be understood that although one interfering source 130 is drawn, any number of interfering sources may be present. Each interfering source may generate interfering signals that may affect the shape of the beam 150 intended by the transmission source 110. In particular, the transmission source 110 may not have the channel characteristics of signals generated by each interfering source 130 that may interfere with the beam 150 and accordingly may not be able to appropriately shape and direct the beam 150 towards the receiving device 120.

In accordance with an embodiment of the present disclosure, the receiving device 120 may compute the channel estimate associated with transmission source 110. In some embodiments, the receiving device 120 may also compute the channel estimate associated with the interfering source 130. In some implementations, the receiving device 120 may compute the channel estimate associated with the interfering source 130 using the channel estimate associated with the transmission source 110. For example, the receiving device 120 may subtract the expected signal multiplied by the channel estimate associated with the transmission source from the received signal to arrive at a channel estimate for the interfering source. Although the interfering source 130 is drawn and described as a single interfering source, the interfering source 130 may be any number of interfering sources which may be at various different locations.

The receiving device 120 may transmit a feedback signal to transmission source 110 that represents the channel estimates of the transmission source 120 and/or the interfering source 130. Receiving device 120 may transmit the feedback signals simultaneously using, for example, the antenna 122. As described in relation to FIGS. 3-6, the feedback signal from the receiving device 120 may include compressed channel state information from which the transmitting device 110 can calculate a steering matrix V that can be used to modify the shape of the beam 150. In some embodiments, the compressed channel state information may include a set of angles from which the steering matrix V can be calculated.

Transmission source 110 may modify the shape of beam 150 based on the feedback signal received from receiving device 120 to compensate for any interference (including noise). For example, transmission source 110 may compute a channel estimate that corresponds to the equivalent channel matrix (that was computed by receiving device 120) based on the feedback signal received from receiving device 120 and data stored in a memory of transmission source 110. In particular, transmission source 110 may use any known channel estimate computation techniques to modify characteristics of the beam 150 to compensate for interference.

In some embodiments, the transmission source 110 may use various precoding techniques (e.g., Singular Value Decomposition or Tomlinson-Harashima precoding) to modify characteristics of the beam 150 to compensate for interference based on the estimated equivalent channel matrix and channel reciprocity. In some implementations, the transmission source 110 may receive the feedback signals over a backward channel. In such circumstances, the transmission source 110 may compute the channel estimate of the backward channel based on the received feedback signal and use channel reciprocity to compute the channel estimate of the forward channel (e.g., using a matrix transpose operation on the backward channel estimate).

Figure 2:
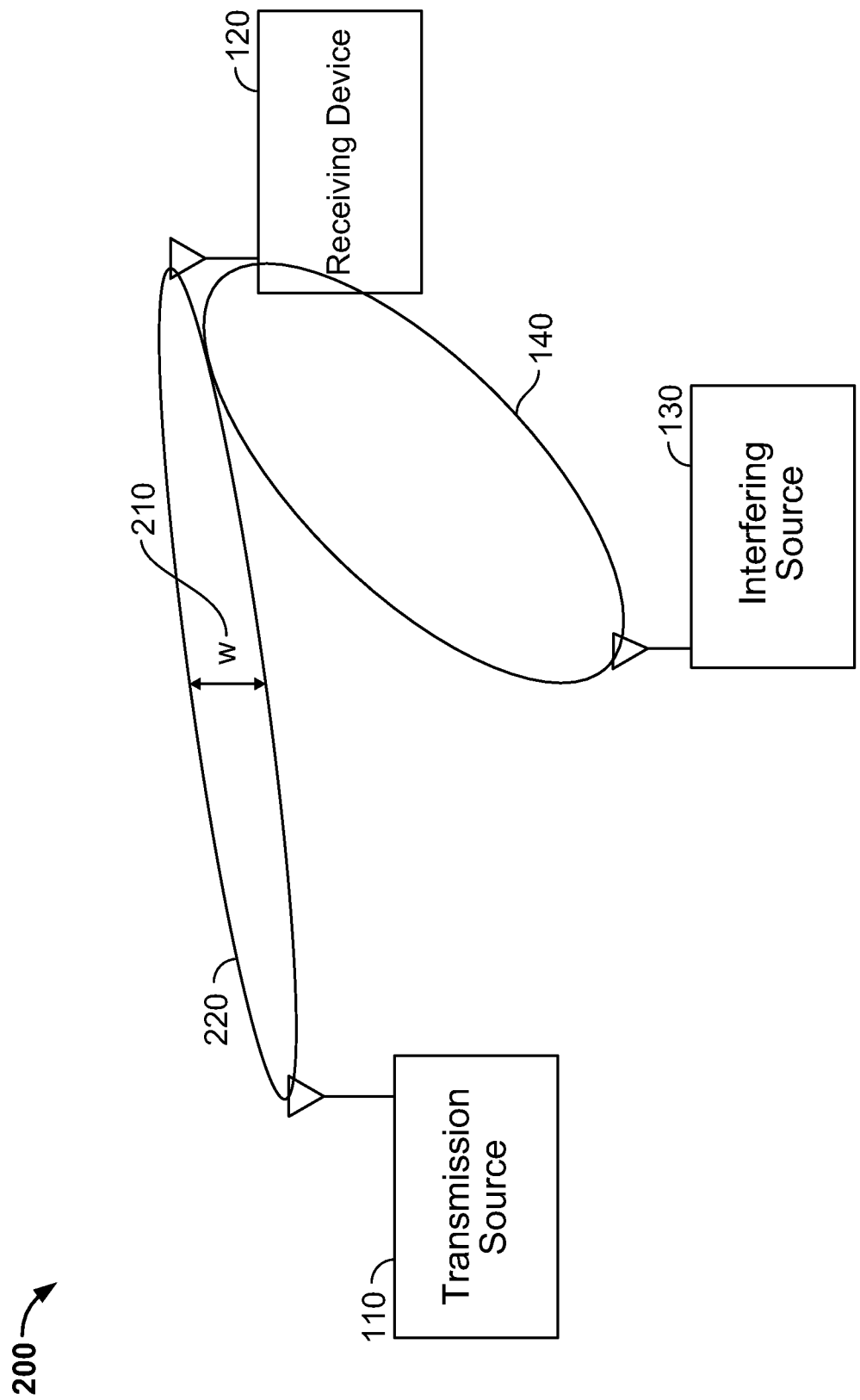

FIG. 2 is a diagram of an illustrative beamforming system 200 in accordance with an embodiment of the present disclosure. As shown in system 200, the transmission source 110 modifies characteristics of the beam 150 (FIG. 1) to compensate for interfering sources and transmits a beam 220 directed towards the receiving device 120. In particular, characteristics of the beam 150 may be modified to reduce the width 152. Alternatively, characteristics of the beam 150 may be modified to generate the beam with higher power (e.g., higher SINR) to compensate for the interfering beam 140. The beam forming with multiple transmit antennas can be achieved by varying the gain (e.g., magnitude and phase) of each antenna. Varying the antenna gains may affect the direction, width and power of the beam.

For example, the transmission source 110 may generate the beam 220 with a minor axis width 210 that is smaller than the minor axis width 152. Accordingly, there is no overlap or insignificant overlap between the interfering beam 140 and the beam 220 and thus the SINR of the beam 220 is not reduced at the receiving device 120.

In some embodiments, the receiving device 120 may direct a beam towards the transmission source 110. This may be performed using the techniques discussed in connection with the transmission source 110. For example, the transmission source 110 may, similarly, transmit a feedback signal to the receiving device 120 that represents a channel estimate and interference associated with signals received by the transmission source 110. The receiving device 120 may shape the beam transmitted to the transmission source 110 based on the feedback signal to increase power (e.g., SINR) and reliability of the data uplink (e.g., the transmission from the receiving device to the access point).

Figure 3:
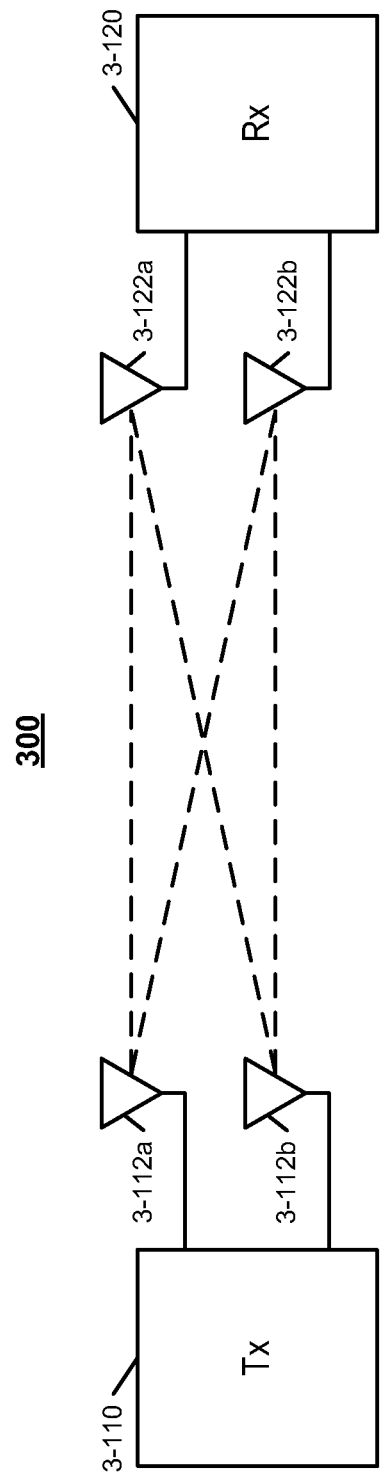
FIG. 3 is a diagram of an illustrative 2×2 multiple-input and multiple-output (MIMO) beamforming system in accordance with an embodiment of the present disclosure.

In some embodiments, the transmission source 110 and receiving device 120 each have two antennas, which creates a 2×2 MIMO system. FIG. 3 is a diagram of an illustrative 2×2 beamforming system 300 in accordance with an embodiment of the present disclosure. The transmission source 3-110 includes a first antenna 3-112a and second antenna 3-112b to transmit signals towards a receiving device 3-120. The receiving device 3-120 includes a first antenna 3-122a and a second antenna 3-122b for receiving the signals from the antennas 3-112a and 3-112b of the transmission source 3-110. As illustrated by the dotted lines, a signal transmitted by the first transmitting antenna 3-112a is received by both receiving antennas 3-122a and 3-122b, and a signal transmitted by the second transmitting antenna 3-112b is also received by both receiving antennas 3-122a and 3-122b.

As described above, the transmission device 3-110 may control the phase and relative amplitude of the signal at each transmitting antenna 3-112a and 3-112b in order to create a pattern of constructive and destructive interference in the wavefront generated by each antenna. This pattern of constructive and destructive interference shapes the beam (i.e., the wave) formed by the combination of the waves from each antenna and points the beam in a particular direction (e.g., towards the receiving device 3-120).

The forward channel between a transmission source with M antennas and a receiving device with N antennas can be described by a channel state matrix H:N×M. In the 2×2 beamforming system 300 shown in FIG. 3, H is 2×2. A signal s:M×1 is transmitted by the transmission source 3-110. The signal is received by the receiving device 3-120 may be represented by the following equation:

$$y = HQ_{steer}s + n \tag{1}$$

in which y:N×1 is a vector of the received signal, $Q_{steer}$:M×N is a steering matrix or spatial mapping matrix that maps the transmitting antennas 3-112 to the receiving antennas 3-122, and n:N×1 is an additive noise vector. $Q_{steer}$ may be determined based on channel information, such as the channel state matrix H, in order to increase signal directivity, increase SINR gain, and exploit spatial diversity gain. The transmission source 3-110 may apply the steering matrix $Q_{steer}$ to the signal s in order to direct the signal towards the receiving device 3-120 or otherwise alter the beam as described in relation to FIG. 2. In the exemplary 2×2 system 300, the received signal y:2×1 is defined as follows:

$$\begin{bmatrix} y_{Rx1} \\ y_{Rx2} \end{bmatrix} = \begin{bmatrix} H_{11} & H_{12} \\ H_{21} & H_{22} \end{bmatrix} \begin{bmatrix} Q_{11} & Q_{12} \\ Q_{21} & Q_{22} \end{bmatrix} \begin{bmatrix} s_{Tx1} \\ s_{Tx2} \end{bmatrix} + \begin{bmatrix} n_{Rx1} \\ n_{Rx2} \end{bmatrix} \quad (2)$$

In order to maintain the channel state information for determining the steering matrix $Q_{steer}$, the transmission source 3-110 receives a feedback signal from the receiving device 3-120, as described above. The receiving device 3-120 sends the feedback signal from any combination of antenna 3-122a, antenna 3-122b, and one or more other antennas (not shown). The transmission source 3-110 receives the feedback signal from any combination of antenna 3-112a, antenna 3-112b, and one or more other antennas (not shown).

The feedback signal can be the full channel state matrix H and/or the steering matrix $Q_{steer}$, or it can be a compressed signal containing values from which the channel state matrix H and/or the steering matrix $Q_{steer}$ can be calculated. In particular, in some embodiments, the steering matrix $Q_{steer}$ a unitary matrix that can be calculated from a set of angles that are generated by the receiving device 3-120 in the process of solving for the steering matrix $Q_{steer}$.

Figure 4:
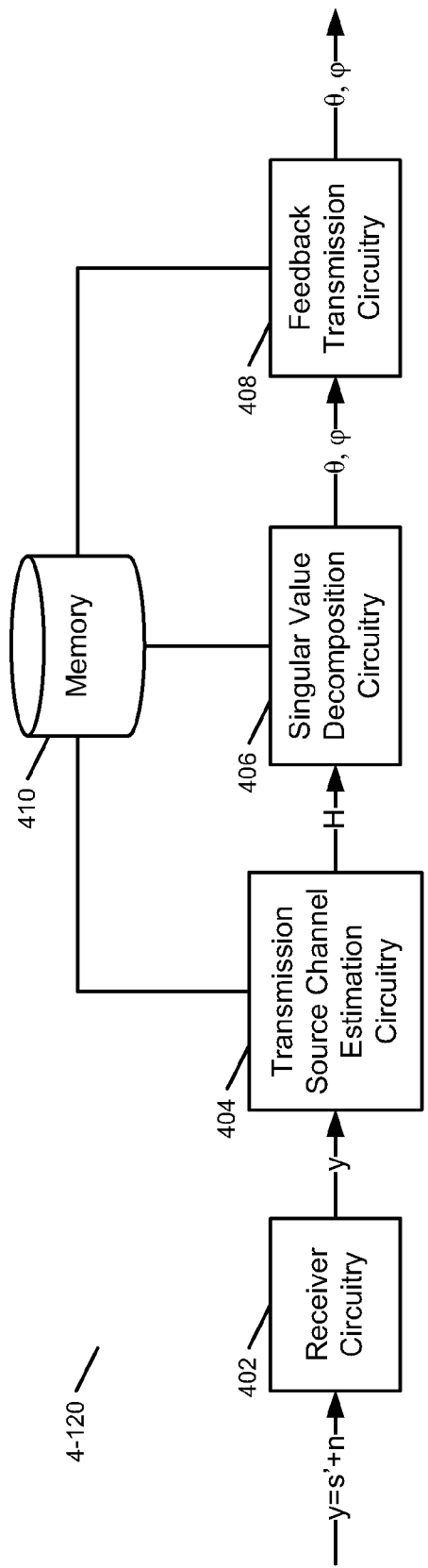
FIG. 4 is a diagram of an illustrative receiving device in accordance with an embodiment of the present disclosure.

FIG. 4 is a diagram of a receiving device 4-120 for calculating a set of angles from which the steering matrix $Q_{steer}$ can be calculated. The receiving device 4-120 includes receiver circuitry 402, transmission source channel estimation circuitry 404, singular value decomposition circuitry 406, feedback transmission circuitry 408, and memory 410.

The receiver circuitry 402 may be coupled to one or more antennas 122 (FIG. 1) of the receiving device 4-120. In some embodiments, the receiver circuitry 402 is coupled to two antennas 122a and 122b, as shown in FIG. 3. The receiver circuitry 402 may include various communication circuitry (not shown) to de-modulate and decode the information received from the transmission source 110 through the beam 150. This system model may be applied to orthogonal frequency division multiplexing (OFDM) on a per-tone basis (e.g., a multiple carrier system where there may be a corresponding received y signal for every carrier).

The receiver circuitry 402 receives a signal y that represents the beam 150 and that is equal to a modified output signal s' from the transmission source 110 plus noise n. The receiver circuitry 402 provides the received signal y to the transmission source channel estimation circuitry 404. Based on the received signal y, the transmission source channel estimation circuitry 404 computes the channel state matrix H of the channel estimate associated with the transmission source 110. The transmission source channel estimation circuitry 404 outputs the channel state matrix H associated with the transmission source 110 to the singular value decomposition circuitry 406 and/or memory 410 for storage. Instructions for computing the channel state matrix H may be stored by the memory 410 and retrieved by or run by the transmission source channel estimation circuitry 404. The memory 410 may be any storage device including a hard disk drive, a CD ROM, EPROM, FPGA, programmable logic device, flash memory, RAM, ROM or any other suitable electronic storage medium.

The singular value decomposition circuitry 406 performs a singular value decomposition (SVD) procedure using the channel state matrix H. In particular, the SVD procedure generates a unitary matrix V, which can be used by the transmission source 110 as the steering matrix $Q_{steer}$ described above in relation to FIG. 3. In some embodiments, the SVD procedure directly generates a set of angles from which the steering matrix can be calculated. In such embodiments, the receiving device 4-120 does not need to perform any additional computation or other processing to compress the steering matrix V since the compressed values from which the steering matrix V can be calculated have already been generated.

In general, the SVD of the channel state matrix can be expressed as follows:

$$H = UAV^H, A = \begin{bmatrix} \sigma_1 & 0 \\ 0 & \sigma_2 \end{bmatrix} \quad (3)$$

in which A is a diagonal matrix with the singular values $\sigma_1$ and $\sigma_2$.

In one embodiment, the SVD computation is performed in two steps. First, the SVD circuitry 406 decomposes H into an orthonormal matrix Q and an upper triangular matrix R using a QR decomposition procedure, and then the SVD circuitry 406 performs SVD on the R matrix. Instructions for QR decomposition and/or the SVD procedure may be stored on memory 410 and retrieved by or run by the SVD circuitry 406. In some embodiments, the QR decomposition is performed by the transmission source channel estimation circuitry 404 or dedicated QR decomposition circuitry (not shown). The QR decomposition may be performed using any suitable QR decomposition process, such as the Gram-Schmidt process, Householder transformations, or Givens rotations. The QR decomposition results in the following Q and R matrices:

$$Q = \begin{bmatrix} 1 & 0 \\ 0 & e^{j\theta_3} \end{bmatrix} \begin{bmatrix} \cos\xi_{21} & \sin\xi_{21} \\ -\sin\xi_{21} & \cos\xi_{21} \end{bmatrix} \begin{bmatrix} e^{j\theta_2} & 0 \\ 0 & e^{j\theta_1} \end{bmatrix} \quad (4)$$

$$R = \begin{bmatrix} r_{11} & r_{12} \\ 0 & r_{22} \end{bmatrix} \quad (5)$$

The R matrix has real positive diagonal values $r_{11}$ and $r_{22}$, and $r_{12}$ is a complex number. After the R matrix is computed, the SVD circuitry 406 uses a closed form Jacobi method to perform SVD on the R matrix. The complex number $r_{12}$ can be expressed in a polar form having a magnitude $|r_{12}|$ and a phase or angle $\phi_{12}$. Using the phase of $r_{12}$, the SVD circuitry 406 diagonalizes the R matrix, first by using two rotations to define a matrix $R_1$:

$$\begin{bmatrix} e^{-j\varphi_{12}} & 0 \\ 0 & 1 \end{bmatrix} \begin{bmatrix} r_{11} & r_{12} \\ 0 & r_{22} \end{bmatrix} \begin{bmatrix} e^{j\varphi_{12}} & 0 \\ 0 & 1 \end{bmatrix} = \begin{bmatrix} r_{11} & |r_{12}| \\ 0 & r_{22} \end{bmatrix} = R_1 \quad (6)$$

As shown below, $\phi_{12}$, the phase of $r_{12}$, is one of the two angles from which the steering matrix V can be calculated, so the angle $\phi_{12}$ is included in the compressed steering matrix feedback to the transmission source 110.

In addition to calculating the angle $\phi_{12}$, the SVD circuitry 406 calculates several more angles for use in the SVD as follows:

$$\theta_{sum} = \tan^{-1}\left(\frac{|r_{12}|}{r_{22} - r_{11}}\right) \quad (7)$$

$$\theta_{diff} = \tan^{-1}\left(\frac{-|r_{12}|}{r_{22} + r_{11}}\right) \quad (8)$$

$$\theta_V = \frac{\theta_{sum} + \theta_{diff}}{2} \quad (9)$$

$$\theta_U = \frac{\theta_{sum} - \theta_{diff}}{2} \quad (10)$$

As demonstrated below, the angle $\phi_{12}$ defined above and the angle $\theta_V$ computed using equation (9) are sufficient for computing the steering matrix V. So, once the SVD circuitry 406 has calculated the angle $\theta_V$, the receiving device 4-120 can transmit the angles $\phi_{12}$ and $\theta_V$ to the transmission source 110, thus giving the transmission source 110 sufficient information to calculate the steering matrix V.

In some implementations, through equation 8, the SVD circuitry 406 has only computed arctangent angle computations and Given's rotations. The Coordinate Rotation Digital Computer (CORDIC) algorithm can be used by the SVD circuitry 406 to perform these computations and to compute the angle $\theta_V$ using equation (9). Accordingly, the hardware implementation of the SVD circuitry 406 in such implementations does not require a multiplier. In some embodiments, the SVD circuitry can consist of only adder and shifter circuitry.

To generate the steering matrix V through the SVD process, the angles $\theta_V$ and $\theta_U$ can be used to rewrite the matrix $R_1$ as follows:

$$R_1 = \begin{bmatrix} \cos\theta_U & \sin\theta_U \\ -\sin\theta_U & \cos\theta_U \end{bmatrix}\begin{bmatrix} \sigma_1 & 0 \\ 0 & \sigma_2 \end{bmatrix}\begin{bmatrix} \cos\theta_V & -\sin\theta_V \\ \sin\theta_V & \cos\theta_V \end{bmatrix} \quad (11)$$

Note that solving equation (11) for $\sigma_1$ and $\sigma_2$ gives the singular values $\sigma_1$ and $\sigma_2$. Solving for R in equation (6), the matrix R can be expressed as follows:

$$R = \begin{bmatrix} e^{j\varphi_{12}} & 0 \\ 0 & 1 \end{bmatrix}\begin{bmatrix} \cos\theta_U & \sin\theta_U \\ -\sin\theta_U & \cos\theta_U \end{bmatrix}\begin{bmatrix} \sigma_1 & 0 \\ 0 & \sigma_2 \end{bmatrix}\begin{bmatrix} \cos\theta_V & -\sin\theta_V \\ \sin\theta_V & \cos\theta_V \end{bmatrix}\begin{bmatrix} e^{-j\varphi_{12}} & 0 \\ 0 & 1 \end{bmatrix} \quad (12)$$

Finally, using the matrix R in equation (12), the channel state matrix H can be expressed as follows:

$$H = QR = \quad (13)$$
$$Q = \begin{bmatrix} e^{j\varphi_{12}} & 0 \\ 0 & 1 \end{bmatrix}\begin{bmatrix} \cos\theta_U & \sin\theta_U \\ -\sin\theta_U & \cos\theta_U \end{bmatrix}\begin{bmatrix} \sigma_1 & 0 \\ 0 & \sigma_2 \end{bmatrix}\begin{bmatrix} \cos\theta_V & -\sin\theta_V \\ \sin\theta_V & \cos\theta_V \end{bmatrix}\begin{bmatrix} e^{-j\varphi_{12}} & 0 \\ 0 & 1 \end{bmatrix}$$

According to equation (3) ($H=UAV^H$, where A contains the singular values $\sigma_1$ and $\sigma_2$), the above equation (13) provides the following SVD factorization matrices U, A, and $V^H$:

$$U = Q\begin{bmatrix} e^{j\varphi_{12}} & 0 \\ 0 & 1 \end{bmatrix}\begin{bmatrix} \cos\theta_U & \sin\theta_U \\ -\sin\theta_U & \cos\theta_U \end{bmatrix} \quad (14)$$

$$A = \begin{bmatrix} \sigma_1 & 0 \\ 0 & \sigma_2 \end{bmatrix} \quad (15)$$

$$V^H = \begin{bmatrix} \cos\theta_V & -\sin\theta_V \\ \sin\theta_V & \cos\theta_V \end{bmatrix}\begin{bmatrix} e^{-j\varphi_{12}} & 0 \\ 0 & 1 \end{bmatrix} \quad (16)$$

Based on equation (16), the steering matrix V can be computed from the Hermitian conjugate of the steering matrix $V^H$ as follows:

$$V = \begin{bmatrix} e^{j\varphi_{12}} & 0 \\ 0 & 1 \end{bmatrix}\begin{bmatrix} \cos\theta_v & \sin\theta_v \\ -\sin\theta_v & \cos\theta_v \end{bmatrix} = \begin{bmatrix} e^{j\varphi_{12}}\cos\theta_v & e^{j\varphi_{12}}\sin\theta_v \\ -\sin\theta_v & \cos\theta_v \end{bmatrix} \quad (17)$$

Thus, according to equation (17), the steering matrix V can be calculated from two angles: $\phi_{21}$ and $\theta_V$. As discussed above, both of these angles are found as a direct result of performing the singular value decomposition: $\phi_{21}$ is the angle of $r_{21}$, which is determined when defining the matrix $R_1$ in equation (6), and $\theta_V$ is calculated in equation (9) which is used for expressing $R_1$ in equation (11) to find the singular values.

In some implementations, the transmission source channel estimation circuitry 404 and the singular value decomposition circuitry 406 may be implemented using the same processing component. For example, the component may compute the channel state matrix H and the angles $\phi_{21}$ and $\theta_V$ sequentially. In particular, during a first number of clock cycles, the component may compute the channel state matrix H of the channel estimate associated with transmission source 110, and during a second number of clock cycles, the component may compute the angles $\phi_{21}$ and $\theta_V$.

In some embodiments, the SVD circuitry 406 performs the above computations only through equation (9) and outputs the angles $\phi_{21}$ and $\theta_V$ to the feedback transmission circuitry 408 without solving for the steering matrix V or the singular values $\sigma_1$ and $\sigma_2$. The memory 410 may have instructions for formatting or transmitting the feedback signal; these instructions can be retrieved by or run by the feedback transmission circuitry 408. In particular, the feedback transmission circuitry 408 or SVD circuitry 406 may quantize the angles $\phi_{21}$ and $\theta_V$ according to a particular communication system protocol used by the transmission source 110. The feedback transmission circuitry 408 then transmits the feedback signal to the transmission source 110. In the embodiment of FIG. 3, the feedback signal may be transmitted by one or both antennas 3-122a and 3-122b, and the feedback signal may be modified based on an estimation of the reverse channel.

In other embodiments, the SVD circuitry 406 further calculates the singular values $\sigma_1$ and $\sigma_2$ according to the following equation:

$$\begin{bmatrix} \sigma_1 & 0 \\ 0 & \sigma_2 \end{bmatrix} = \begin{bmatrix} \cos\theta_U & -\sin\theta_U \\ \sin\theta_U & \cos\theta_U \end{bmatrix}\begin{bmatrix} r_{11} & |r_{12}| \\ 0 & r_{22} \end{bmatrix}\begin{bmatrix} \cos\theta_v & \sin\theta_v \\ -\sin\theta_v & \cos\theta_v \end{bmatrix} \quad (18)$$

The singular values $\sigma_1$ and $\sigma_2$ can also be output to the feedback transmission circuitry 408 and included in the feedback signal (not shown in FIG. 4). In some embodiments, the SVD circuitry 406 or other circuitry in the receiving device 4-120 that receives the singular values $\sigma_1$ and $\sigma_2$ orders the singular values from higher to lower and switches the columns in the steering matrix V if the order has changed. The SVD circuitry 406 or other receiving device circuitry can use the ordered singular values to calculate post-processing signal-to-noise ratios for the modulation and coding scheme (MCS) selection. For example, a signal-to-noise ratio (SNR) for one of the antennas i may be calculated by adding the difference between the received signal strength indication (RSSI) and the noise factor (NF) to the singular value:

$$SNR_i = \sigma_i + (RSSI - NF) \tag{19}$$

The SNRs can then be output to the feedback transmission circuitry 408 and fed back to the transmission source 110 in the feedback signal transmitted by the feedback transmission circuitry 408.

Figure 5:
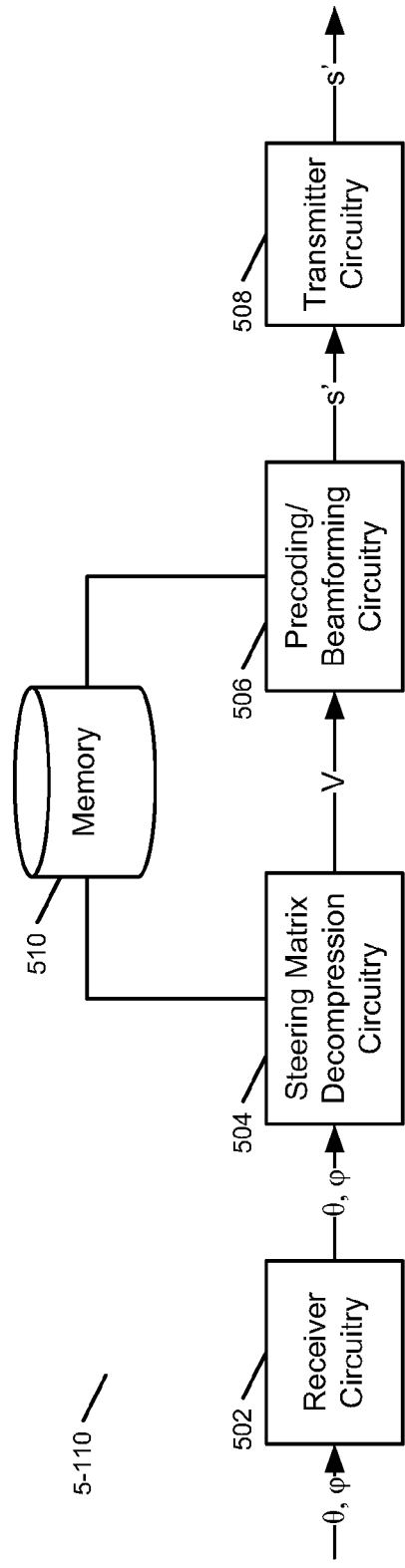
FIG. 5 is a diagram of an illustrative transmission source in accordance with an embodiment of the present disclosure.

FIG. 5 is a diagram of a transmission source 5-110 for forming a beam based on a steering matrix V calculated from a set of angles received from a receiving device 120. Transmission source 5-110 includes receiver circuitry 502, steering matrix decompression circuitry 504, precoding/beamforming circuitry 506, transmitter circuitry 508, and memory 510.

The receiver circuitry 502 may be coupled to one or more antennas 112 (FIG. 1) of transmission source 5-110. In some embodiments, the receiver circuitry 502 is coupled to two antennas 112a and 112b, as shown in FIG. 3. The receiver circuitry 502 may include various communication circuitry (not shown) to de-modulate and decode the information received from a receiving device 120. As shown in FIG. 5, the receiver circuitry 502 receives a feedback signal that includes the angles $\phi_{21}$ and $\theta_V$ from a receiving device 120. The feedback signal may include additional information, such as data identifying the receiving device 120 and/or the singular values or SNRs calculated by the receiving device 120 as discussed in relation to FIG. 4. If this system model is applied to orthogonal frequency division multiplexing (OFDM), there may be a feedback signal received for every carrier or a feedback signal that contains feedback (e.g., the angles $\phi_{21}$ and $\theta_V$) for every carrier. In other embodiments, the compressed feedback may contain one or more sets of angles $\phi_{21}$ and $\theta_V$, and each set can be used to determine steering matrices for multiple carriers.

The receiver circuitry 502 provides the angles $\phi_{21}$ and $\theta_V$ from the feedback signal to the steering matrix decompression circuitry 504. The steering matrix decompression circuitry 504 computes the steering matrix V that the transmission source 110 uses for steering a beam transmitted to the receiving device 120. The steering matrix decompression circuitry 504 calculates the steering matrix V using equation (17) derived above in relation to FIG. 4:

$$V = \begin{bmatrix} e^{j\varphi_{12}}\cos\theta_V & e^{j\varphi_{12}}\sin\theta_V \\ -\sin\theta_V & \cos\theta_V \end{bmatrix} \tag{17}$$

The steering matrix decompression circuitry 504 outputs the steering matrix V to the precoding/beamforming circuitry 506 and/or memory 510 for storage. Instructions for computing the steering matrix V may be stored by the memory 510 and retrieved by or run by the transmission source channel estimation circuitry 504. The memory 510 may be any storage device including a hard disk drive, a CD ROM, EPROM, FPGA, programmable logic device, flash memory, RAM, ROM or any other suitable electronic storage medium.

The precoding/beamforming circuitry 506 uses the steering matrix V to precode the beam 150 transmitted by the transmitter circuitry 508 to the receiving device 120. For example, a signal s to be transmitted by two antennas 112a and 112b of the transmission source 5-110 can be precoded as follows:

$$s' = Vs \tag{20}$$

The precoding/beamforming circuitry 506 may modify one or more characteristics of the transmitted beam 150 (FIG. 1) as desired. For example, precoding/beamforming circuitry 506 may change a phase, frequency, power or amplitude of the transmitted beam to compensate for interference. The changed beam 220 (FIG. 2) may be more accurately pointed towards receiving device 3-120.

The transmitter circuitry 508 receives the precoded signal s' and transmits this signal s' to the receiving device 120. The transmitter circuitry 508 may be coupled to one or more antennas 112 (FIG. 1), such as antennas 3-112a and 3-112b (FIG. 3), for transmitting the beam 150. In some embodiments, the transmitter circuitry 508 modulates and encodes the data vector s, which may be retrieved from memory 510, and transmits the data vector in a beam with characteristics provided by the precoding/beamforming circuitry 506. In some implementations, the transmitter circuitry 508 may share circuitry used for downlink in a base station or transmission source.

There exist other singular value decomposition procedures that result in the two angles $\phi_{21}$ and $\theta_V$ from which a steering matrix V can be calculated. In another embodiment, rather than performing a QR decomposition and performing SVD on the R matrix, as described above in relation to FIG. 4, the SVD circuitry 406 can be configured to perform SVD on the correlation matrix B of the channel state matrix H. The closed form Jacobi method can be used to perform the SVD once the correlation matrix B is computed. The SVD circuitry 406 computes the correlation matrix B according to the following equation:

$$B = H^H H = \begin{bmatrix} B_{11} & B_{12} \\ B_{12}^* & B_{22} \end{bmatrix} \tag{21}$$

In equation (21), $B^*_{12}$ is the complex conjugate of $B_{12}$, and $B_{11}$ and $B_{22}$ are real positive numbers. Instructions for calculating the correlation matrix B and/or performing the SVD computations may be stored on memory 410 and retrieved by or run by the SVD circuitry 406. In some embodiments, the computation of the correlation matrix B is performed by the transmission source channel estimation circuitry 404 or dedicated correlation calculation circuitry (not shown).

Singular value decomposition is then performed on the correlation matrix B. The complex number $B_{12}$ can be expressed in a polar form having a magnitude $|B_{12}|$ and a phase or angle $\phi_{12}$. Angle $\phi_{12}$ is one of the two angles for calculating the steering matrix V. Using the phase of $B_{21}$, the SVD circuitry 406 performs two rotations of the correlation matrix B, resulting in a matrix having all real positive values:

$$\begin{bmatrix} 1 & 0 \\ 0 & e^{j\varphi_{12}} \end{bmatrix} \begin{bmatrix} B_{11} & B_{12} \\ B_{12}^* & B_{22} \end{bmatrix} \begin{bmatrix} 1 & 0 \\ 0 & e^{-j\varphi_{12}} \end{bmatrix} = \begin{bmatrix} B_{11} & |B_{12}| \\ |B_{12}| & B_{22} \end{bmatrix} \tag{22}$$

From the above equation, the second rotation matrix $$\begin{bmatrix} 1 & 0 \\ 0 & e^{-j\varphi_{12}} \end{bmatrix}$$

is defined as $V_1$, which, as shown below, is an intermediate matrix that can be used to generate the steering matrix V. The second angle for calculating V, $\theta_V$, is calculated from $\theta_{sum}$, which the SVD circuitry 406 computes as follows:

$$\theta_{sum} = \tan^{-1}\left(\frac{2|B_{12}|}{B_{22} - B_{11}}\right) \quad (23)$$

The SVD circuitry 406 then computes $\theta_V$ as follows:

$$\theta_V = \frac{\theta_{sum}}{2} \quad (24)$$

The steering matrix V can be calculated from the angles $\phi_{12}$ and $\theta_V$. So, once the SVD circuitry 406 has calculated the angle $\theta_V$, the receiving device 4-120 can transmit the angles $\phi_{12}$ and $\theta_V$ to the transmission source 110, thus giving the transmission source 110 sufficient information to calculate the steering matrix V. To derive the steering matrix V, another intermediate matrix $V_2$ is computed as follows:

$$V_2 = \begin{bmatrix} \cos\theta_v & \sin\theta_v \\ -\sin\theta_v & \cos\theta_v \end{bmatrix} \quad (25)$$

The steering matrix V can be calculated by multiplying $V_1$ with $V_2$:

$$V = V_1 V_2 = \begin{bmatrix} 1 & 0 \\ 0 & e^{-j\varphi_{12}} \end{bmatrix} \begin{bmatrix} \cos\theta_v & \sin\theta_v \\ -\sin\theta_v & \cos\theta_v \end{bmatrix} = \begin{bmatrix} \cos\theta_v & \sin\theta_v \\ -e^{-j\varphi_{12}}\sin\theta_v & e^{-j\varphi_{12}}\cos\theta_v \end{bmatrix} \quad (26)$$

By defining $\phi = -\phi_{12}$, the expression for V in equation (26) can be rewritten as follows:

$$V = \begin{bmatrix} \cos\theta_v & \sin\theta_v \\ -e^{j\varphi}\sin\theta_v & e^{j\varphi}\cos\theta_v \end{bmatrix} \quad (27)$$

Based on this derivation, a transmission source 110, having received the angles $\phi_{12}$ (or $\phi = -T\phi_{12}$) and $\theta_V$ in a feedback signal from a receiving device 120, can compute the steering matrix V for beamforming using a process similar to the process described in relation to FIGS. 4 and 5, but with the steering matrix V calculated according to equation (27).

In addition, the singular values can be calculated according to the following equation:

$$\begin{bmatrix} \sigma_1 & 0 \\ 0 & \sigma_2 \end{bmatrix} = \begin{bmatrix} \cos\theta_V & -\sin\theta_V \\ \sin\theta_V & \cos\theta_V \end{bmatrix} \begin{bmatrix} B_{11} & |B_{12}| \\ |B_{12}| & B_{22} \end{bmatrix} \begin{bmatrix} \cos\theta_v & \sin\theta_v \\ -\sin\theta_v & \cos\theta_v \end{bmatrix} \quad (28)$$

As described in relation to FIG. 4, the receiving device 120 can order the singular values, compute signal-to-noise ratios, and transmit the singular values and/or SNRs in the feedback signal.

In some embodiments, the above process is applied to a MIMO system with orthogonal frequency-division multiplexing (i.e., a MIMO-OFDM system). MIMO-OFDM systems may be wireless systems such as those described in relation to FIG. 1 or wired systems, such as home network or other LAN systems using, for example, the G.hn standard. In such systems, a receiving device 120 can send the angles $\phi_{12}$ and $\theta_V$ for each subcarrier. For an OFDM system with many subcarriers, sending the angles for each subcarrier may cause the receiving device 120 to send a high number of bits. To reduce the number of bits, the channel information can be further compressed using subcarrier grouping. Due to channel coherence bandwidth, the angles $\phi_{12}$ and $\theta_V$ for nearby subcarriers may be similar, so the same angles $\phi_{12}$ and $\theta_V$ can be used for each subcarrier in a group of subcarriers, e.g., a group of 2, 4, or 8 subcarriers.

If the subcarriers are grouped in this manner, the receiving device 120 can compute the set of angles $\phi_{12}$ and $\theta_V$ for a selection of the subcarriers based on the group size, e.g., for every second, fourth, or eighth subcarrier, using a process similar to the process described in relation to FIG. 4. The selection of subcarriers for which the steering matrix V is solved can be determined in one of several ways. The receiving device 120 may only receive a signal for a subset of subcarriers (e.g., for every second, fourth, or eighth subcarrier) and feed back the angles $\phi_{12}$ and $\theta_V$ calculated for each of the received subcarriers. Alternatively, the receiving device 120 can receive signals from all subcarriers and solve for the angles $\phi_{12}$ and $\theta_V$ for only a subset of the subcarriers. Alternatively, the receiving device 120 can receive signals from all subcarriers and solve for the angles $\phi_{12}$ and $\theta_V$ for each of the subcarriers and then determine representative angles for each group of subcarriers, e.g., by taking the average value of the angle $\phi_{12}$ and the average value of the angle $\theta_V$ for each group of subcarriers. The selection of subcarriers can be defined by a protocol known to or communicated to the transmission device 110 and the receiving device 120.

Once the receiving device 120 has calculated a set of angles $\phi_{12}$ and $\theta_V$ for each group of subcarriers, the receiving device 120 transmits the angles $\phi_{12}$ and $\theta_V$ for each group subcarriers as feedback to the transmission source 110. The feedback may indicate to which subcarrier(s) the transmission source 110 should apply the steering matrix V calculated from each set of angles. Alternatively, a communications protocol may define the number of carriers in each group and the order in which angles for subcarriers is transmitted in the feedback; the transmission source 110 can reference this protocol to match up each set of angles to a group of subcarriers.

In some MIMO-OFDM systems, a cyclic shift is performed on the signal transmitted from some antennas. This causes the OFDM symbols transmitted from one antenna to be shifted with respect to another antenna. The cyclic shift does not alter the angle $\theta_V$ between adjacent subcarriers, but the angle $\phi_{12}$ is rotated from one subcarrier to the next. This rotation in the angle $\phi_{12}$ depends on the cyclic shift between antennas. The rotation can be calculated as follows:

$$\Delta\phi_{12} = 2 * \pi * T_{CS} * F_{SC} \quad (29)$$

In equation (29), $T_{CS}$ is the cyclic shift time and $F_{SC}$ is the frequency separation between subcarriers. Depending on how the protocol defines the precoding matrix, the sign of the angle $\phi_{12}$ could decrease from one subcarrier to the next rather than increase, so the sign of equation (29) may be flipped.

In one embodiment, the subcarrier grouping compression is used in a power line communication network using a G.hn standard or a related standard. The networking protocol defines that for each group of subcarriers, the angles $\phi_{12}$ and $\theta_V$ for the first subcarrier in the group, which is the lowest frequency subcarrier in the group, are computed by the receiving device 120 and returned to the transmission source 110. In this embodiment, the angle between adjacent subcarriers may be 0.0981175 radians. Upon receiving an angle $\phi_{12}$ for one subcarrier group, the transmission source 110 can add 0.0981175 radians to each additional subcarrier in the group and compute the steering matrix V for each subcarrier based on the angle $\phi_{12}$ computed in this fashion and the angle $\theta_V$ from the feedback signal.

Figure 6:
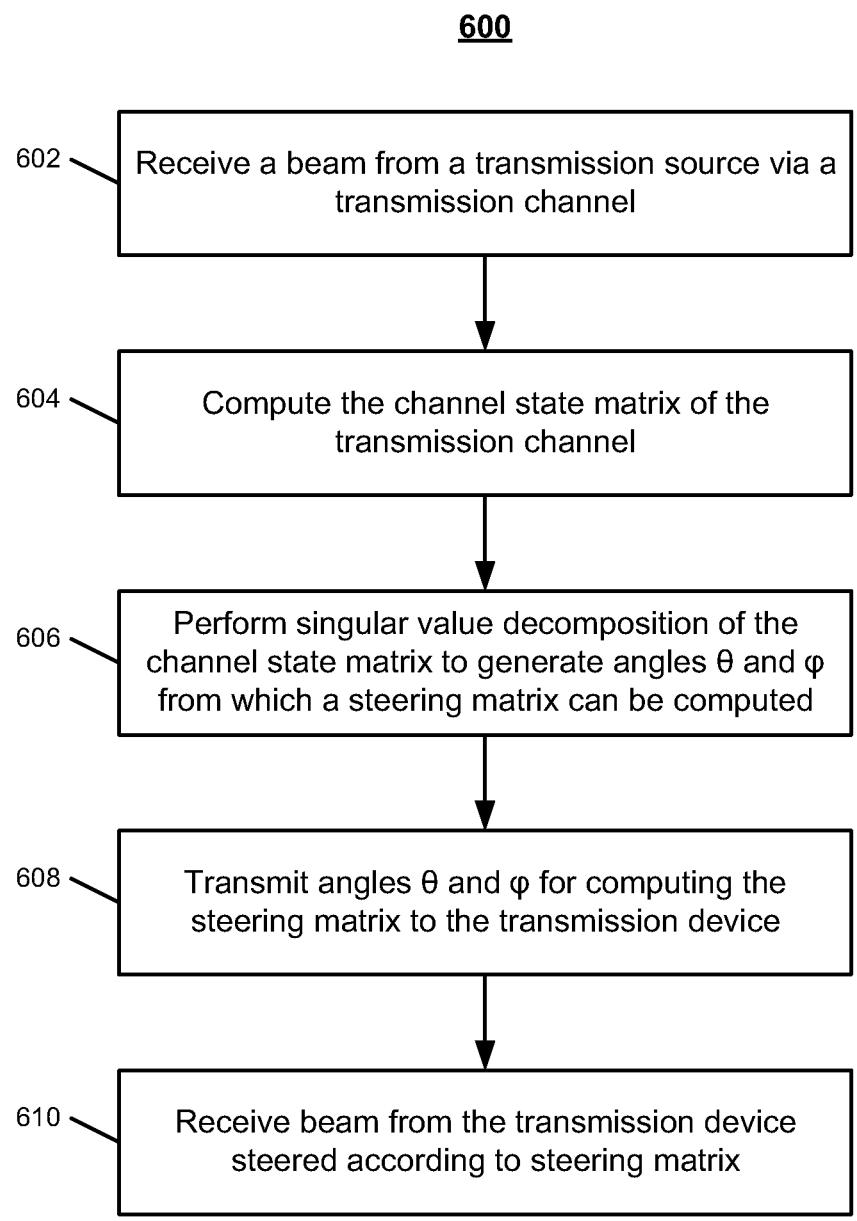
FIG. 6 illustrates a process for providing feedback channel state information in accordance with an embodiment of the present disclosure.

FIG. 6 illustrates a process 600 for providing feedback information to a transmission device in accordance with an embodiment of the present disclosure. At 602, a beam transmitted by a transmission source is received at a receiving device. The received beam may be affected by an interference signal from an interfering source. For example, beam 150 is transmitted by transmission source 110 (FIG. 1). The beam 150 may be transmitted by two antennas 3-112a and 3-112b of the transmission source 110 and received by two antennas 3-122a and 3-122b of the receiving device 120 (FIG. 3).

At 604, a channel state matrix that represents the transmission channel between the transmission source 110 and the receiving device 120 is computed at the receiving device 120. For example, the transmission source channel estimation circuitry 404 (FIG. 4) can compute the channel state matrix H of the channel estimate associated with transmission source 110 from a received signal y. For a 2×2 MIMO system, the channel state matrix H is a 2×2.

At 606, the receiving device 120 performs singular value decomposition of the channel state matrix H. To perform the SVD, the SVD circuitry 406 of the receiving device 120 may first perform a QR decomposition of the channel state matrix and then perform SVD of the resulting R matrix, as described in relation to FIG. 4. Alternatively, the SVD circuitry 406 may compute the correlation matrix $B=H^H H$ and then perform SVD of the resulting B matrix, as described above. In some embodiments, such as power line systems, the noise covariance may be significant. In such systems, the noise covariance matrix K, which has been previously assumed to be an identity matrix, is not an identity matrix. In such embodiments, the noise covariance matrix K can be estimated and $H_{eq}=K^{-1/2}H$ can be calculated. The SVD circuitry 406 then performs SVD of $H_{eq}$ rather than H using either of the above-described methods.

Either of these SVD processes results in two angles $\phi$ and $\theta$, which may be angles $\phi_{12}$ and $\theta_V$ defined above in equations (6) and (9), respectively. A steering matrix for the transmission source 110 can be computed from these angles $\phi$ and $\theta$, using, for example, equation (17) or (27). The formula for calculating the steering matrix can be modified from these formulas based on how the communications protocol defines the angles $\phi$ and $\theta$ and the steering matrix.

At 608, the receiving device 120 transmits the feedback angles $\phi$ and $\theta$ to the transmission device 110. From this compressed feedback, the transmission device 110 can calculate a steering matrix $Q_{steer}$, which may be the V matrix that results from a singular value decomposition process. The transmission device 110 applies the steering matrix to a signal to be transmitted and transmits a steered beam as shown in FIG. 2. At 610, the receiving device 120 receives the beam that was transmitted from the transmission source 110 and steered by the transmission source 110 according to the steering matrix $Q_{steer}$.

The foregoing describes methods and apparatuses for directing a beam towards a receiving device (e.g., beamforming). The above described embodiments of the present disclosure are presented for the purposes of illustration and not of limitation. Furthermore, the present disclosure is not limited to a particular implementation. For example, one or more steps of methods described above may be performed in a different order (or concurrently) and still achieve desirable results. In addition, the disclosure may be implemented in hardware, such as on an application specific integrated circuit (ASIC) or on a field-programmable gate array (FPGA). The disclosure may also be implemented in software.

What is claimed is:

1. A method for providing feedback channel state information, the method comprising:
   receiving, at a receiving device, a beam transmitted by a transmitting device;
   computing, at the receiving device, a channel state matrix H of the transmission channel based on the received beam;
   performing, at the receiving device, a singular value decomposition procedure, using the channel state matrix H, that produces:
     a set of angles ($\theta_V$, $\phi$) for defining a steering matrix V;
     a third angle $\theta_U$;
     a rotation of an R matrix, wherein the R matrix is generated based on a decomposition of the channel state matrix H; and
     singular values of the channel state matrix H based on the angle $\theta_V$, the third angle $\theta_U$, and the R matrix; and
   transmitting, by the receiving device, the set of angles ($\theta_V$, $\phi$) to the transmitting device, wherein the steering matrix V is computable by the transmitting device based on the set of angles ($\theta_V$, $\phi$) transmitted to the transmitting device.

2. The method of claim 1, wherein the singular value decomposition procedure comprises:
   performing a QR decomposition of the channel state matrix H to determine a Q matrix and the R matrix; and
   performing a singular value decomposition of the R matrix, using a closed form Jacobi method, to determine the Hermitian transpose of the steering matrix ($V^H$).

3. The method of claim 1, wherein the singular value decomposition procedure comprises:
   determining the Hermitian transpose of the channel state matrix ($H^H$);
   calculating a product $H^H H$ by multiplying the Hermitian transpose of the channel state matrix ($H^H$) by the channel state matrix H; and
   performing a singular value decomposition of the product $H^H H$ using a closed form Jacobi method.

4. The method of claim 1, further comprising:
   receiving, by the receiving device, a directed beam from the transmitting device, where the beam is directed based on the steering matrix V calculated by the transmitting device from the received angles ($\theta_V$, $\phi$).

5. The method of claim 1, wherein the transmitting the set of angles ($\theta_V$, $\phi$) further comprises transmitting the singular values.

6. The method of claim 2, wherein the singular value decomposition procedure further comprises:
   calculating a signal-to-noise ratio of the channel based on one of the singular values.

7. The method of claim 2, wherein the steering matrix V is calculated from the set of angles ($\theta_V$, $\phi$) in accordance with:

$$V = \begin{bmatrix} e^{j\varphi}\cos\theta_V & e^{j\varphi}\sin\theta_V \\ -\sin\theta_V & \cos\theta_V \end{bmatrix}.$$

8. The method of claim 3, further comprising:
   deriving the singular values of the channel state matrix H based on the angle $\theta_V$ and a rotation of the product $H^H H$; and
   calculating a signal-to-noise ratio of the channel based on one of the derived singular values.

9. The method of claim 3, wherein the steering matrix V is calculated from the set of angles ($\theta_V$, $\phi$) in accordance with:

$$V = \begin{bmatrix} \cos\theta_V & \sin\theta_V \\ -e^{j\varphi}\sin\theta_V & e^{j\varphi}\cos\theta_V \end{bmatrix}.$$

10. The method of claim 4, wherein the beam comprises a first subcarrier and a second subcarrier, a steering matrix V for the first subcarrier is based on the set of angles ($\theta_V$, $\phi$), and a steering matrix $V_2$ for the second subcarrier is based on a second set of angles ($\theta_V$, $\phi_2$).

11. The method of claim 10, wherein the angle $\phi_2$ is determined by shifting the angle $\phi$ by a phase increment calculated as follows:

phase increment=$2*\pi*T_{CS}*F_{SC}$ wherein:
$T_{CS}$ is a cyclic shift time; and
$F_{SC}$ is the frequency separation between the first subcarrier and the second subcarrier.

12. A receiving device for providing feedback channel state information, the receiving device comprising:
a receiver configured to receive a beam transmitted by a transmitting device;
control circuitry configured to:
compute a channel state matrix H of the transmission channel based on the received beam;
perform a singular value decomposition procedure, using the channel state matrix H, that produces:
a set of angles ($\theta_V$, $\phi$) for defining a steering matrix V;
a third angle $\theta_U$;
a rotation of an R matrix, wherein the R matrix is generated based on a decomposition of the channel state matrix H; and
singular values of the channel state matrix H based on the angle $\theta_V$, the third angle $\theta_U$, and the R matrix; and
a transmitter configured to transmit the set of angles ($\theta_V$, $\phi$) to the transmitting device, wherein the steering matrix V is computable by the transmitting device based on the set of received angles ($\theta_V$, $\phi$) transmitted to the transmitting device.

13. The receiving device of claim 12, wherein the control circuitry is further configured to:
perform a QR decomposition of the channel state matrix H to determine a Q matrix and the R matrix; and
perform a singular value decomposition of the R matrix, using a closed form Jacobi method, to determine the Hermitian transpose of the steering matrix ($V^H$).

14. The receiving device of claim 12, wherein the control circuitry is further configured to:
determine the Hermitian transpose of the channel state matrix ($H^H$);
calculate a product $H^H H$ by multiplying the Hermitian transpose of the channel state matrix ($H^H$) by the channel state matrix H; and
perform a singular value decomposition of the product $H^H H$ using a closed form Jacobi method.

15. The receiving device of claim 12, wherein the receiver is further configured to:
receive a directed beam from the transmitting device, where the beam is directed based on the steering matrix V calculated by the transmitting device from the received angles ($\theta_V$, $\phi$).

16. The receiving device of claim 13, wherein the control circuitry is further configured to:
calculate a signal-to-noise ratio of the channel based on one of the singular values.

17. The receiving device of claim 13, wherein the control circuitry is configured to calculate the steering matrix V from the set of angles ($\theta_V$, $\phi$) in accordance with:

$$V = \begin{bmatrix} e^{j\varphi}\cos\theta_V & e^{j\varphi}\sin\theta_V \\ -\sin\theta_V & \cos\theta_V \end{bmatrix}.$$

18. The receiving device of claim 14, wherein the control circuitry is further configured to:
derive the singular values of the channel state matrix H based on the angle $\theta_V$ and a rotation of the product $H^H H$; and
calculate a signal-to-noise ratio of the channel based on one of the derived singular values.

19. The receiving device of claim 14, wherein the control circuitry is configured to calculate the steering matrix V from the set of angles ($\theta_V$, $\phi$) in accordance with:

$$V = \begin{bmatrix} \cos\theta_V & \sin\theta_V \\ -e^{j\varphi}\sin\theta_V & e^{j\varphi}\cos\theta_V \end{bmatrix}.$$

20. The receiving device of claim 15, wherein the beam comprises a first subcarrier and a second subcarrier, a steering matrix V for the first subcarrier is based on the set of angles ($\theta_V$, $\phi$), and a steering matrix $V_2$ for the second subcarrier is based on a second set of angles ($\theta_V$, $\phi_2$).

21. The receiving device of claim 20, wherein the angle $\phi_2$ is determined by shifting the angle $\phi$ by phase increment calculated as follows:

phase increment=$2*\pi*T_{CS}*F_{SC}$ wherein:
$T_{CS}$ is a cyclic shift time; and
$F_{SC}$ is the frequency separation between the first subcarrier and the second subcarrier.

* * * * *